US007371110B2

(12) United States Patent
Murakami et al.

(10) Patent No.: US 7,371,110 B2
(45) Date of Patent: May 13, 2008

(54) CONNECTOR

(75) Inventors: Yuichi Murakami, Shizuoka (JP); Yoshitaka Kashima, Aichi (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/590,013

(22) PCT Filed: Mar. 10, 2005

(86) PCT No.: PCT/JP2005/004727

§ 371 (c)(1),
(2), (4) Date: Aug. 21, 2006

(87) PCT Pub. No.: WO2005/088778

PCT Pub. Date: Sep. 22, 2005

(65) Prior Publication Data

US 2007/0173112 A1 Jul. 26, 2007

(30) Foreign Application Priority Data

Mar. 12, 2004 (JP) ............................ 2004-070120

(51) Int. Cl.
*H02B 1/01* (2006.01)

(52) U.S. Cl. ...................................... 439/557; 439/248

(58) Field of Classification Search ................ 439/247, 439/248, 544, 552–557
See application file for complete search history.

(56) References Cited

U.S. PATENT DOCUMENTS 5,739,465 A 4/1998 Kameyama .............. 174/50.51
6,033,241 A 3/2000 Iwata et al.
6,095,855 A 8/2000 Iwata et al. ................. 439/553
6,241,551 B1 6/2001 Watanabe
6,321,446 B1 11/2001 Iwata et al.
6,776,637 B2 * 8/2004 Yamada et al. ............. 439/247

FOREIGN PATENT DOCUMENTS

| | | |
|---|---|---|
| EP | 0 896 397 A2 | 2/1999 |
| JP | 09-148003 | 6/1997 |
| JP | 11-86961 | 3/1999 |
| JP | 11-97106 | 4/1999 |

* cited by examiner

*Primary Examiner*—Khiem Nguyen
(74) *Attorney, Agent, or Firm*—Kratz, Quintos & Hanson, LLP

(57) ABSTRACT

An object of the present invention is to provide a connector having a pair of connector housings fitted through an attachment hole in a body panel, which is easily confirmed whether or not the fitting is complete. The connector 1 has a first connector housing 3 and a second connector housing 4, and a position regulator 5. The connector housing 4 has a flange 17. The position regulator 5 regulates the movement of the first connector housing 3 until the connector housings 3 and 4 are fitted, and allows its movement after fitting. The first connector housing 3 is temporary locked in a hole 7 of a panel 2 and the second connector housing 4 is fitted. After the fitting of the connector housings 3 and 4, the second connector housing 4 is approached to the body panel 2. The flange 17 approaches to the body panel 2. The second connector housing 4 is locked to the body panel 2.

4 Claims, 9 Drawing Sheets

CONNECTOR

TECHNICAL FIELD

The present invention relates to a connector to connect electric wire.

RELATED ART

A wire harness utilized for mobile car has a connector having a first connector housing and a second connector housing which fit each other through the panel of the car. The panel is located between the first connector housing and the second connector housing. A through-hole is formed in the panel to pass the first and second connector housing.

It is known that the first connector housing is temporarily fixed to a attachment hole of the panel and the second connector housing is fitted into the first connector to mount (see, JP,H11-97106,A). These connector housings have metallic terminal posts which are connected electrically by fitting. Electric wire is attached to the terminal posts.

The conventional connector has a freely slidable member in the second connector housing in a perpendicular direction to the fitting direction. The slidable member moves to the perpendicular direction to the second connector housing with the fit of each connector housing.

The second connector housing is fitted to the first connector housing which is fixed temporarily to the attachment hole of the panel. The slidable member moves to the perpendicular direction as described to fit each connector housing and release the temporary fix of the first connector housing to the panel. Then, the second connector housing is pressed to the first connector housing to attain the fit of each connector housing and to fix the second connector housing to the attachment hole of the panel.

DISCLOSURE OF THE INVENTION

The conventional connector is fitted by pressing a second connector housing to a first connector housing to fit each other. While pressing the second connector housing to the first connector housing, it is changed from the temporary fix of the first connector housing to the fix of the second connector housing to the panel.

Fitting is made by pressing the second connector housing to the first connector housing. However, there is a difficulty to confirm whether or not the fit is completed. When the fit of the connector housing is incomplete, i.e. intermediate state, it becomes difficult to connect assuredly the terminal posts each other electrically.

Each connector housing is fitted by pressing the second connector housing to the first connector housing. There occurs the intermediate fit state of each connector housing so that the electrical connection between the terminal posts becomes unstable and undesirable.

The present invention is to provide a connector which is capable of confirming easily the fit through the attachment hole of a panel of the connector housing.

In order to attain the above object, a connector according to claim 1 of the present invention is provided. The connector comprises a first connector housing; a second connector housing to be fitted to the first connector housing through a hole of a panel positioned between the first and second connector housings; wherein the first connector housing has a temporary locking means to lock in the hole of the panel, wherein the second connector housing has a main body pass through the hole, a locking means to lock in the hole, and a outwardly projecting flange outside the main body, and wherein the temporary locking means has an unlocking means to unlock the temporary lock of the temporary locking means of the first connector housing in the hole, when the second connector housing is fitted to the first connector housing temporarily locked in the hole, wherein the temporary locking means has a position regulator means, when the second connector housing is fitted to the first connector housing locked in the hole temporarily, the position regulator means regulating the first connector housing to move relatively with respect to the panel until the fitting of the first connector housing and the second connector housing, and when the fitting completed, the position regulator means allowing the first connector housing to move relatively with respect to the panel, wherein, the panel is positioned between the locking means and the flange which moves the second connector housing toward the panel to lock the locking means in the hole, after the second connector housing is fitted to the first connector housing with the temporary locking means locked temporarily in the hole.

The connector according to claim 2 of the present invention further comprises a tubular grommet fitted in the outer circumference of the second connector housing, the grommet fitting outside the flange and covering one end of the second connector housing, the one end contacting the panel as the second connector housing approaches when the first connector housing and the second connector housing are fitted one another.

The connector according to claim 3 of the present invention further comprises a hood pass through the hole of the panel, and a outwardly projecting press flange on the hood, wherein the press flange holds the panel with the temporary locking means when the temporary locking means is locked in the hole of the panel.

According to the connector of the present invention as claimed in claim 1, after the complete fitting of both connector housings, the flange of the second connector housing is approached to the panel. The locking means is locked in the hole of the panel to position the panel between the locking means and the flange. The position regulator means regulates the first connector housing to move until the complete fitting of both connector housings.

The distance between the flange and the panel at the complete fitting of both connector housings is shorter than that at the incomplete fitting (intermediate fitting).

According to the connector as claimed in 2, when the second connector housing is approached to the panel after the complete fitting of both connector housings, the end face of the grommet contacts the panel. The end face of the grommet contacts the panel when the fitting of both connector housings is complete and there occurs a gap between the end face of the grommet and the panel when the fitting is incomplete (intermediate fitting).

According to the connector of the present invention as claimed in claim 3, the panel is positioned between the temporary locking means and the press flange. Thereby, the temporary locking means is locked temporarily in the hole of the panel so that the first connector housing is prevented from rattling.

BEST MODE FOR CARRYING OUT THE INVENTION

Figure 1:
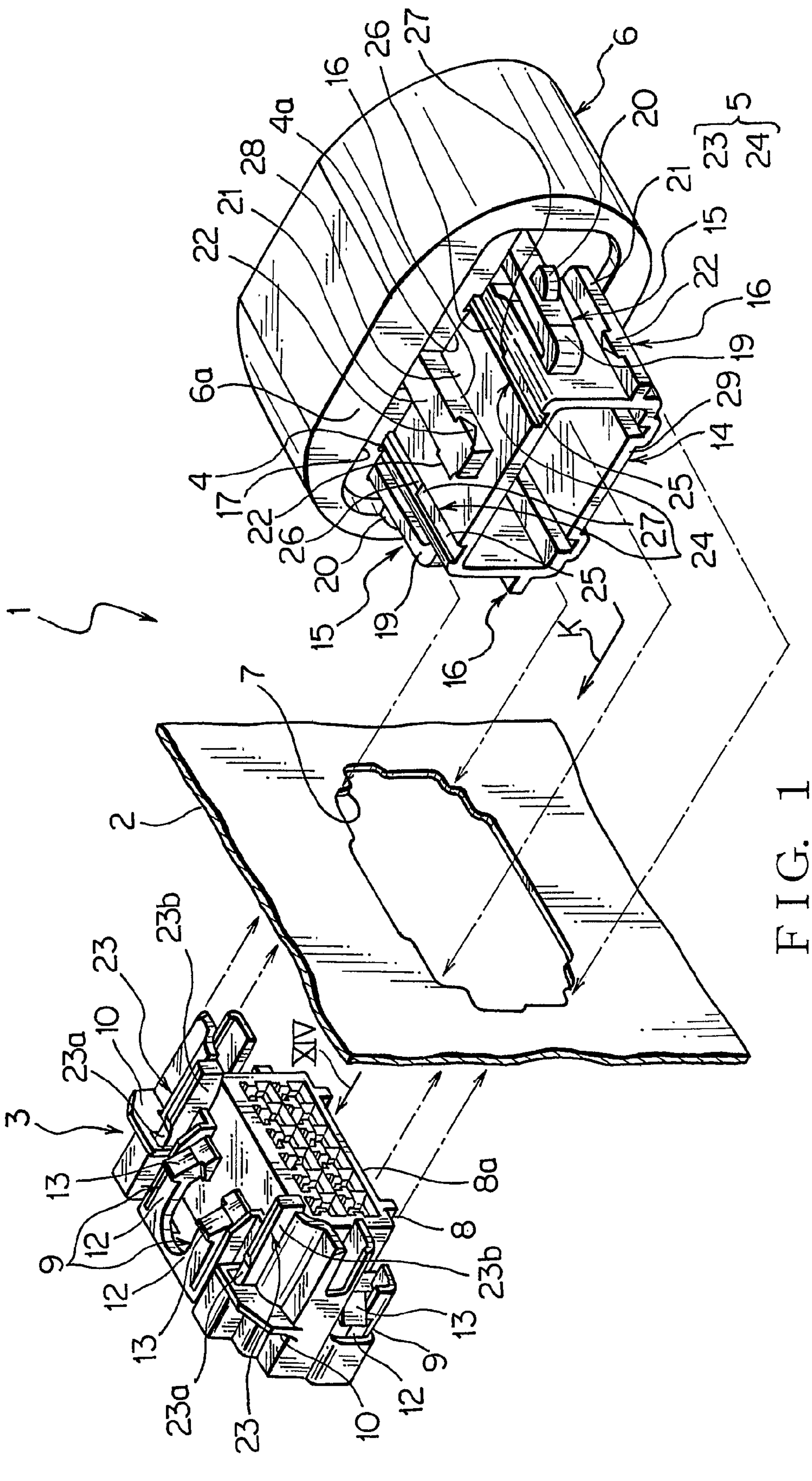
FIG. 1 is an exploded perspective view of a connector of an embodiment of the present invention.

A connector according to an embodiment of the present invention is explained referring to FIGS. 1-16. The connector 1 shown in FIG. 1 is arranged in car. The connector 1 has a first connector housing 3, a second connector housing 4, a position regulator 5, and a grommet 6 intervening a body panel (panel) 2 forming a car body as shown in FIG. 1.

Figure 6:
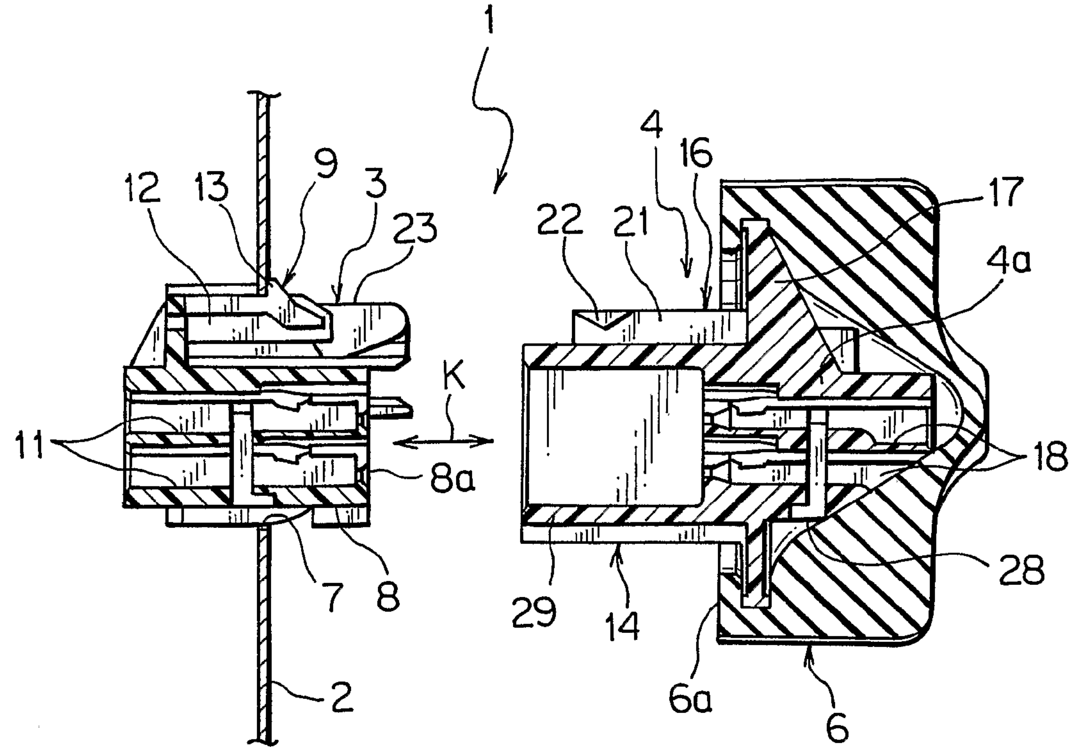
FIG. 6 is a sectional view taken along line VI-VI in FIG. 2.
Figure 13:
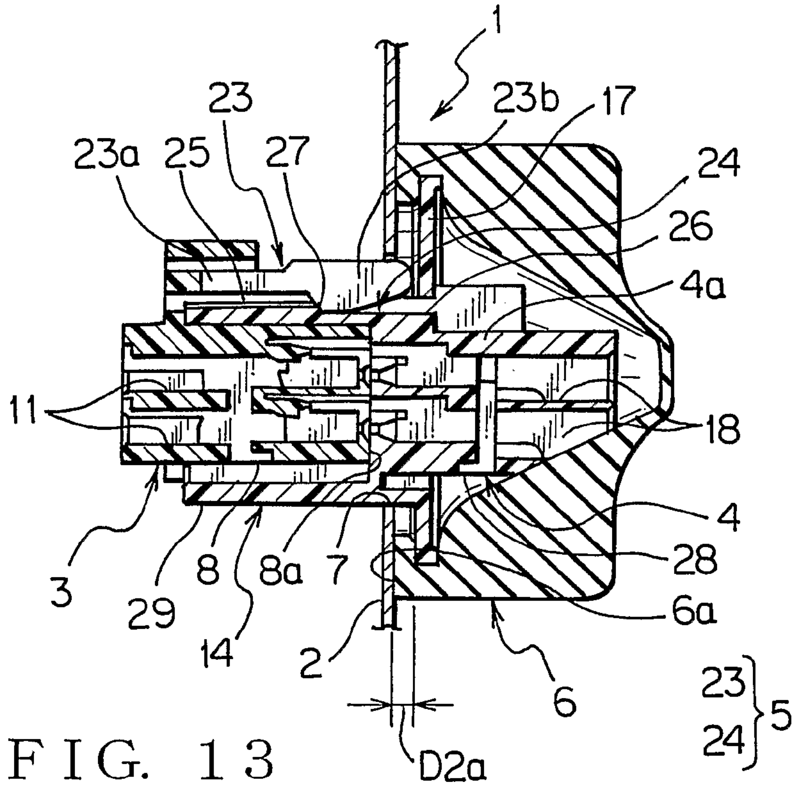
FIG. 13 is a sectional view taken along line XIII-XIII in FIG. 5.

The body panel 2 has a hole 7 (through-hole) as shown in FIGS. 1, 6 and 13. The first connector housing 3 and the second connector housing 4 both are fitted each other by passing hoods 8 and 29 through the hole 7. The connector housings 3 and 4 approach each other to fit along the arrow direction K parallel to the lengthwise direction of terminal receivers 11 and 18 described later. The first connector housing 3 and the second connector housing 4 both are fitted each other by passing the body panel 2 through the hole 7 to position the connectors. The first connector housing 3 and the second connector housing 4 are fixed to the body panel 2.

Figure 14:
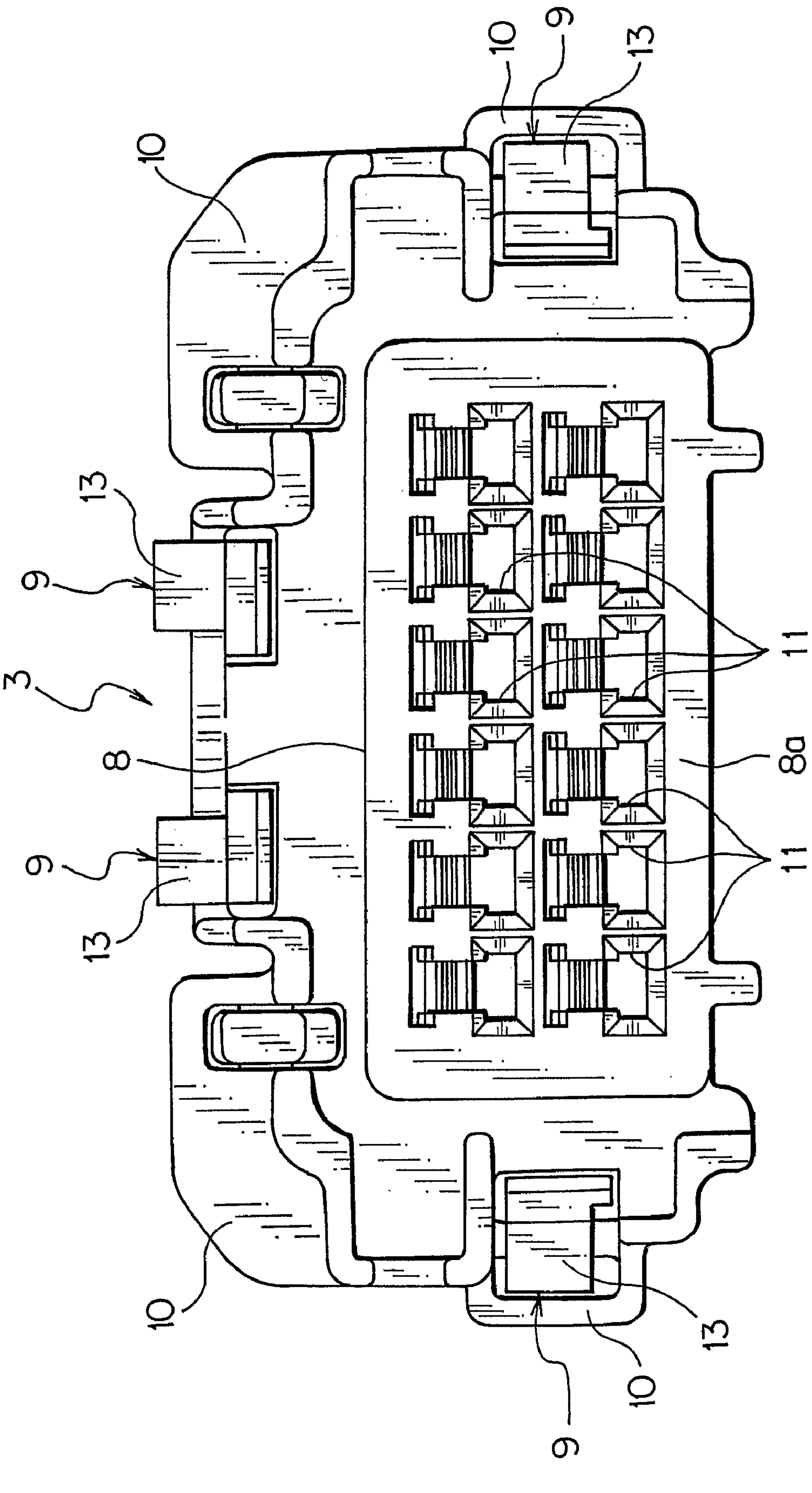
FIG. 14 is a front view of the first connector housing shown in FIG. 1 when viewed from an arrow XIV.

The first connector housing 3 is made of synthetic resin, and has the hood 8, a plurality of temporary locking arms 9 and a press flange 10 as shown in FIGS. 1 and 14. The hood 8 has a box shape and the plurality of terminal receivers 11 as shown in FIGS. 6-13. The terminal receiver 11 is linear shaped and receives female terminal (not shown) and is arranged in parallel to each other.

When fitting the connector housing 3 and 4 one another, the hood 8 enters into the hood 29 of a main body 14 of the second connector housing 4. An end face 8*a* of the hood 8 of the front side in FIG. 1 opposes to the second connector housing 4 and enters into the hood 29 of the second connector housing 4 along the lengthwise direction of the terminal receiver 11, i.e. the female terminal.

The temporary locking arm 9 has an arm main body 12 connecting to the outer wall of the hood 8 at one end, and a temporary locking projection 13 as a locking means. The arm main body 12 extends to the end face 8*a* side, i.e. the second connector housing side 4, from one end connected to the hood 8. The temporary locking arm 9 of the arm main body 12 is elastic in the direction apart from the hood 8.

The temporary locking projection 13 is disposed at the other end of the arm main body 12. The temporary locking projection 13 protrudes outwardly at the first connector housing 3 from the other end of the arm main body 12. The temporary locking projection 13 is lockable inside the hole 7 of the body panel 2.

By locking the temporary locking projection 13 inside the hole 7 of the body panel 2, the temporary locking arm 9 is temporary locked in the hole 7 of the body panel 2. Since the arm main body 12 is elastically deformed, the temporary locking arm 9 can lock the temporary locking projection 13 into the hole 7 of the body panel 2 and unlock it. The temporary locking projection 13 is locked in the inner edge of the hole 7. At this state, the arm main body 12 is not elastically deformed.

The press flange 10 extends outwardly from the outside of the hood 8. The press flange 10 holds the body panel 2 with the temporary locking projection 13 of the temporary locking arm 9 locked inside the hole 7 to prevent the first connector housing 3 from rattling against the body panel 2.

The second connector housing 4 is made of synthetic resin. It has the main body 14, a plurality of locking arms 15, a plurality of unlocking ribs 16 for unlocking, and a flange 17.

The main body 14 has a box-shaped receiver 28 receiving male terminal posts (not shown) and the tubular hood 29 connecting to the receiver 28. The receiver 28 and hood 29 are aligned in the direction of the arrow K. The receiver 28 has the plurality of terminal receivers 18 as shown in FIGS. 6-13. Each terminal receiver 18 is formed linearly and receives the male terminal. It is aligned parallel each other.

The hood 8 of the first connector housing 3 enters inside the hood 29 when the connector housings 3 and 4 fit one another. Thereby, the electric contact portion (not shown) of the male terminal enters into the electric contact portion of the female terminal received in the first connector housing 3. Then, both terminal posts are connected electrically.

The locking arm 15 has an arm main body 19 connected to the outer wall of the main body 14 at one end and a locking projection 20 as a locking means. The lengthwise direction of the arm main body 19 is parallel to the fitting direction between the connector housings 3 and 4, namely the terminal receiver 18. The other end of the locking arm 15 is elastically deformed apart from the main body 14.

The locking projection 20 is disposed in the middle of the arm main body 19. The locking projection 20 extends outwardly at the second connector housing 4 from the middle of the arm main body 19.

When the locking projection 20 is locked inside the hole 7 of the body panel 2, the locking arm 15 is locked. Since the arm main body 19 is elastically deformed, the locking arm 15 can lock the locking projection 20 into the hole 7 of the body panel 2 and unlock it. The locking projection 20 is locked in the inner edge of the hole 7. At this state, the arm main body 19 is not elastically deformed.

An unlocking rib 16 is arranged to align with the temporary locking arm 9 along the approaching direction of the connector housings 3 and 4 (the arrow K) when both connectors fit. The unlocking rib 16 corresponds to the temporary locking arm 9.

The unlocking rib 16 has a rib main body 21 integrated to the outside wall of the main body 14 and an unlocking projection 22. The rib main body 21 protrudes from the outer surface of the main body 14. The lengthwise direction of the rib main body 21 is parallel to the fitting direction, to which each connector housing approaches, between the connector housing 3 and 4, i.e. the terminal receivers 11 and 18. The unlocking projection 22 is disposed in one end of the rib main body 21 to the side of the first connector housing 3. The unlocking projection 22 protrudes along the width direction of the second connector housing 4 from both edges of the rib main body 21. The unlocking projection 22 is formed in a tapered triangle which tapers to the main body 14.

When the connector housings 3 and 4 both approach to fit one another, the unlocking projection 22 contacts to the corresponding temporary locking projection 13 of the temporary locking arm 9 of the first connector housing 3 and deforms elastically the arm main body 12 of the temporary locking arm 9 in such that the other end is close to the hood 8. After fitting, the unlocking projection 22 allows the unlocking arm 9 to return to the initial state of no elastic deformation.

The flange 17 extends outwardly from the outer surface of the receiver 28 of the main body 14. The body panel 2 is positioned between the flange 17 and the locking projection 20 of the locking arm 15 locked in the hole 7 of the body panel 2. The flange 17 protrudes from the outer surface of the receiver 28 of the main body 14 along the circumference of the second connector housing 4.

The position regulator 5 includes a position regulator arm 23 and a step portion 24. The position regulator arm 23 is disposed in the first connector housing 3. The position regulator arm 23 is connected to the outer wall of the hood 8 at one end 23*a*. The position regulator arm 23 extends toward the end face 8*a*, i.e. the second connector housing 4 side, from the one end 23*a* connected to the hood 8 of the first connector housing 3. The thickness of other end 23*b* is thicker than that of the one end 23*a* in the position regulator arm 23.

The position regulator arm 23 is resilient in the direction perpendicular to the surface of the hood 8. When the other end 23*b* is held by the inner edge of the hole 7 and apart from the hood 8 resiliently, the first connector housing 3 is regulated to move with respect to the body panel 2. When the other end 23*b* is close to the hood 8 and is in the initial state of no elastic deformation, it is not held by the inner edge of the hole 7 and the first connector housing 3 is allowed to move relatively with respect to the body panel 2.

The step portion 24 is disposed on the outer wall of the main body 14 of the second connector housing 4. The step portion 24 includes a high portion 25 close to the first connector housing 3, a low portion 26 apart from the first connector housing 3, and a step face 27 disposed between and connected to the high portion 25 and low portion 26. The high portion 25, the low portion 27 and the step face 27 forms the outer surface of the second connector housing 4. The high portion 25 is higher than the low portion 26 at the surface of the second connector housing 4. When the connector housings 3 and 4 are fitted one another, the other end 23*b* of the position regulator arm 23 abuts to the high portion 25 and the low portion 26, i.e. the step portion 24.

When the other end 23*b* of the position regulator arm 23 abuts the high portion 25, the position regulator arm 23 deforms elastically apart the hood 8. When the other end 23*b* abuts to the low portion 26, it approaches to the hood 8 and the position regulator arm 23 is positioned to the initial state of no elastic deformation. The other end 23*b* of the position regulator arm 23 abuts the high portion 25 until the fitting of the first and second connector housings 3 and 4 is completed. When the fitting completed, the other end 23*b* abuts to the low portion 26.

When the second connector housing 4 is fitted into the first connector housing 3, the temporary locking arm 9 of which being locked in the hole 7 of the body panel 2, the position regulator arm 23 and the step portion 24 regulate the first connector housing 3 to move relatively with respect to the body panel 2 until the complete fitting of the connector housings 3 and 4. After the completion of the fitting between the first and second connector housings 3 and 4, the position regulator arm 23 and the step portion 24 allows the first connector housing 3 to move relatively with respect to the body panel 2.

The step portion 24 displaces the position regulator arm 23 from inside to outside the hole 7 of the body panel 2 during fitting of the connector housings 3 and 4. The step portion 24 stops the displacement of the position regulator arm 23 at the completion of the fitting.

The grommet 6 is made of resilient synthetic resin such as rubber and formed in tubular shape and holds the second connector housing 4 inside. The grommet 6 is fitted to the outer circumference of the receiver 28 of the main body 14 of the second connector housing 4. The grommet 6 is fitted outside the flange 17 all around the second connector housing 4. The grommet 6 covers the end portion 4*a* on the side of the flange 17 of the second connector housing 4. The grommet 6 covers the end portion 4*a* which is located apart from the locking projection 20 and near the flange 17 of the second connector housing 4.

Electric wires enter into the grommet 6 and are connected to male terminal posts received in the terminal receiver 18. The grommet 6 keeps watertight with the electric wire to prevent water or liquid from entering into the terminal receiver 18, i.e. the second connector housing 4.

The grommet 6 is fitted to the outer circumference of the receiver 28 of the main body 14 of the second connector housing 4 and has a flat end face 6*a* opposing the first connector housing 3 with respect to the surface of the body panel 2. The grommet 6 is attached to the body panel 2 by contacting the end face 6*a* to the surface of the body panel 2. When the end face 6*a* is in contact with the body panel 2, the grommet 6 keeps watertight with the body panel 2.

Figure 2:
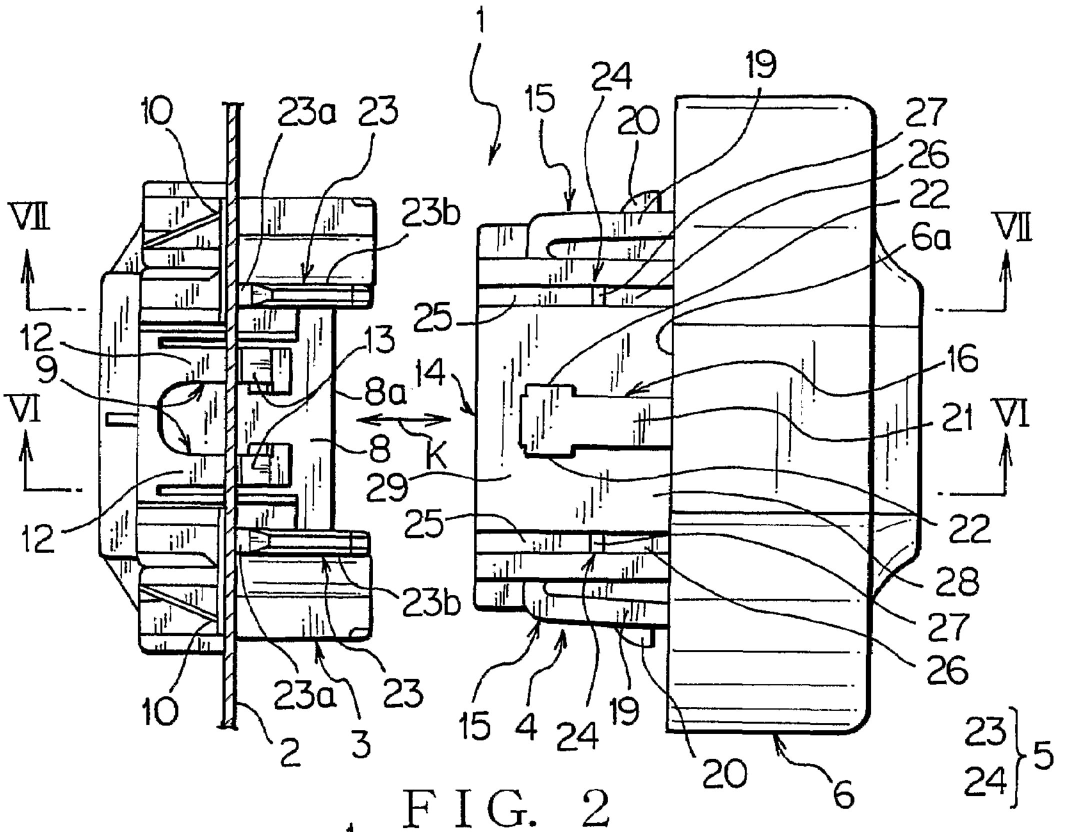
FIG. 2 is a plan view of the connector of FIG. 1.
Figure 7:
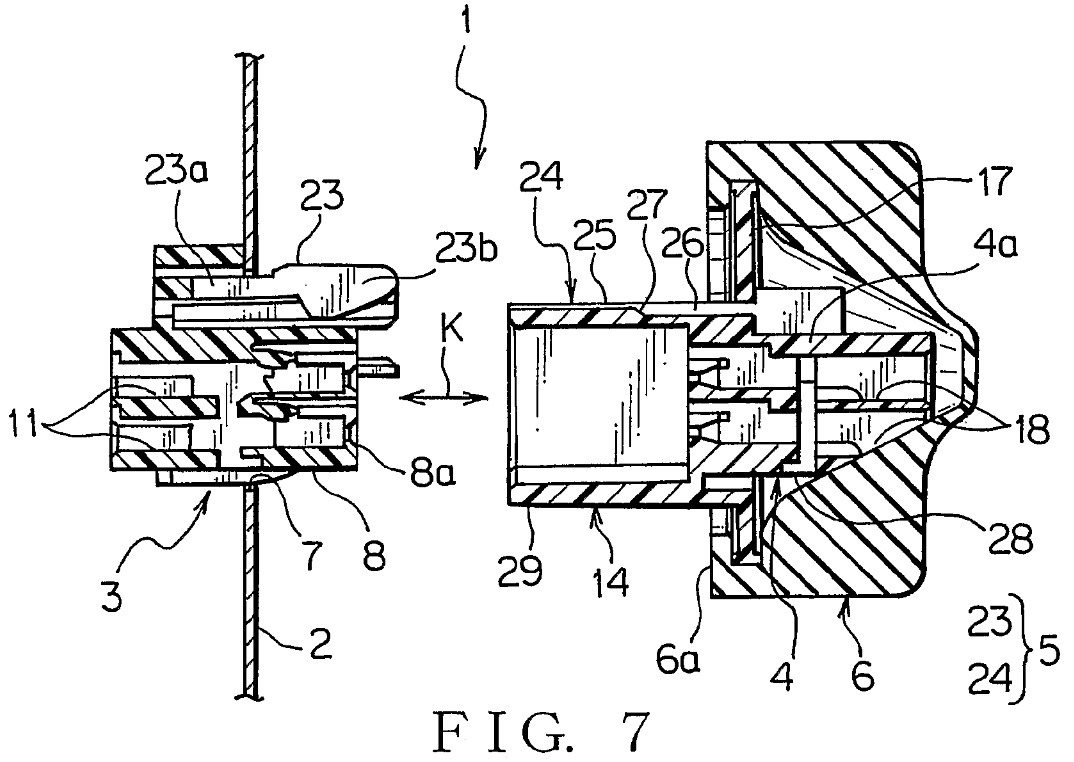
FIG. 7 is a sectional view taken along line VII-VII in FIG. 2.

In order to assemble the mentioned connector 1, the grommet 6 is first fitted to the outer circumference of the receiver 28 of the main body 14 of the second connector housing 4. The end portion 4*a* of the second connector housing 4 is covered by the grommet 6. As shown in FIGS. 2, 6 and 7, the temporary locking arm 9 is locked to the inside edge of the hole 7 of the body panel 2 to lock temporarily. Thereby, the first connector housing 3 is temporarily attached to the hole 7 of the body panel 2.

Figure 3:
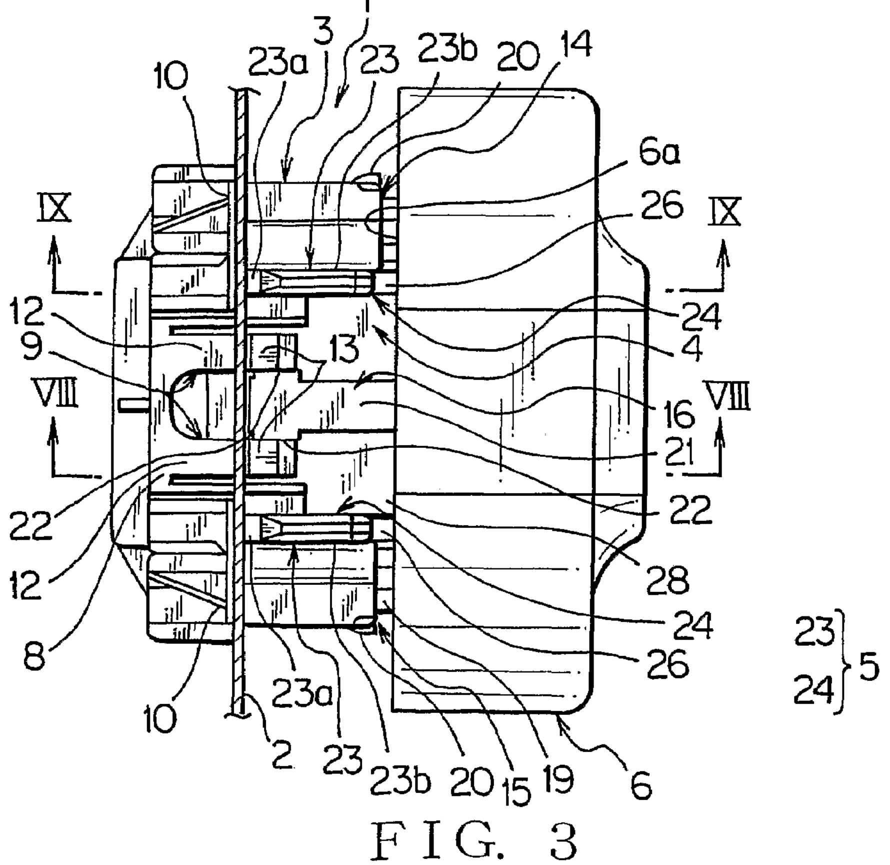
FIG. 3 is a plan view during fitting between a first connector housing and a second connector housing shown in FIG. 2.
Figure 4:
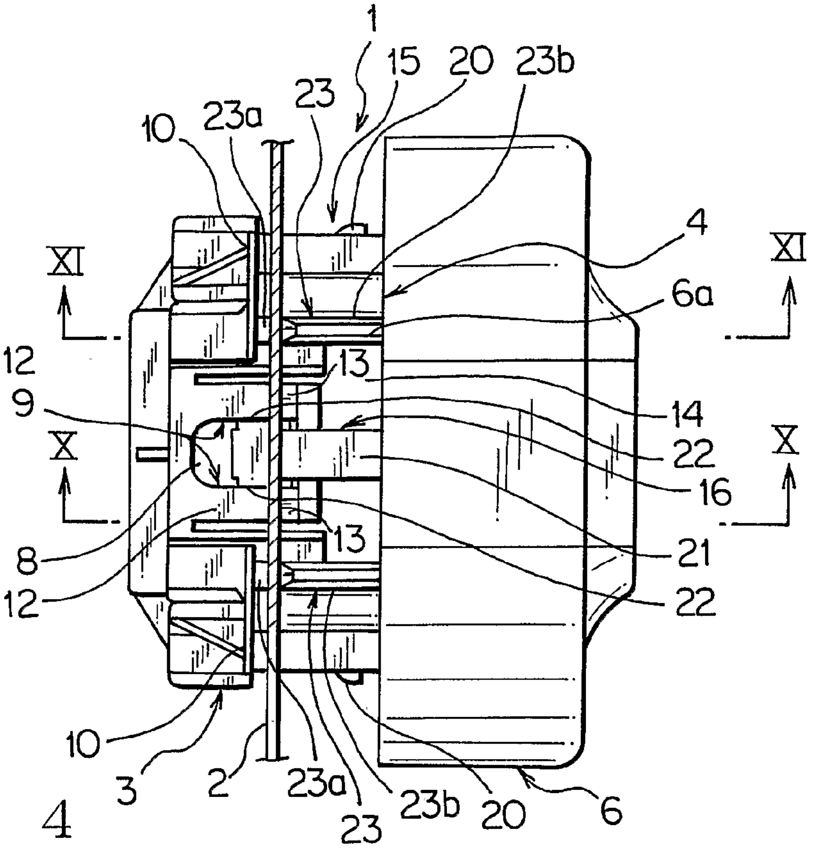
FIG. 4 is a plan view showing the fitting of the first connector housing and the second connector housing shown in FIG. 3.

As shown in FIG. 3, the second connector housing 4 is approached to the first connector housing 3 and the hood 8 of the first connector housing 3 is inserted gradually into the hood 29 of the main body 14 of the second connector housing 4.

Figure 8:
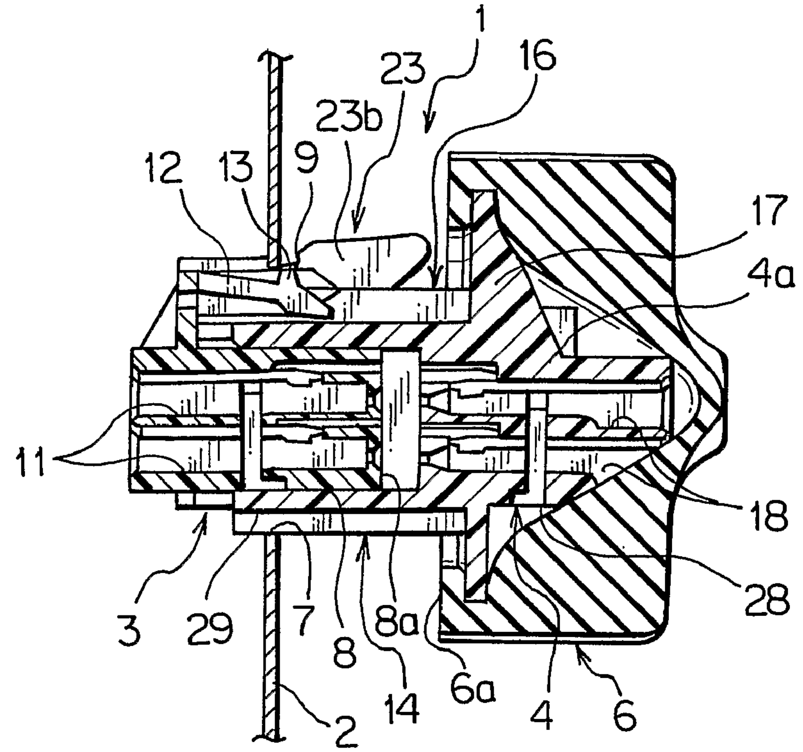
FIG. 8 is a sectional view taken along line VIII-VIII in FIG. 3.

As shown in FIG. 8, the temporary locking projection 13 of the temporary locking arm 9 contacts to the unlocking projection 22 of the unlocking rib 16. The other end of the arm main body 12 approaches to the hood 8 and the temporary locking arm 9 elastically deforms. The unlocking rib 16 unlocks the temporary locking arm 9 from the inner edge of the hole 7 of the body panel 2.

Figure 9:
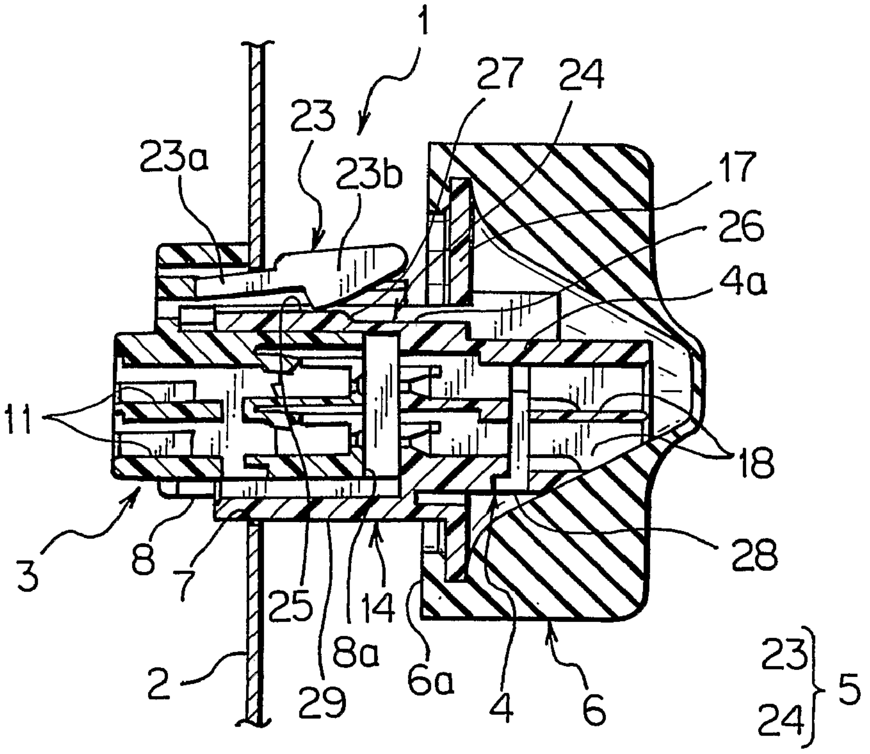
FIG. 9 is a sectional view taken along line IX-IX in FIG. 3.

As shown in FIG. 9, the high portion 25 of the step portion 24 abuts the other end 23*b* of the position regulator arm 23. The position regulator arm 23 deforms elastically in the separating direction of the other end 23*b* from the hood 8. Although the temporary locking arm 9 is unlocked, since the other end 23*b* is deformed elastically in the separating direction from the hood 8, the position regulator arm 3 regulates the first connector housing 3 to move relatively with respect to the body panel 2.

When the fitting between the first connector housing 3 and the second connector housing 4 is incomplete, i.e. intermediate fitting, the first connector housing 3 can not move with respect to the body panel 2. At this state, the distance between the end face 6*a* of the grommet 6 and the body panel 2 is larger than D1 of FIGS. 10 and 11, and the distance between the flange 17 and the body panel 2 is larger than D2 of FIGS. 10 and 11.

Figure 10:
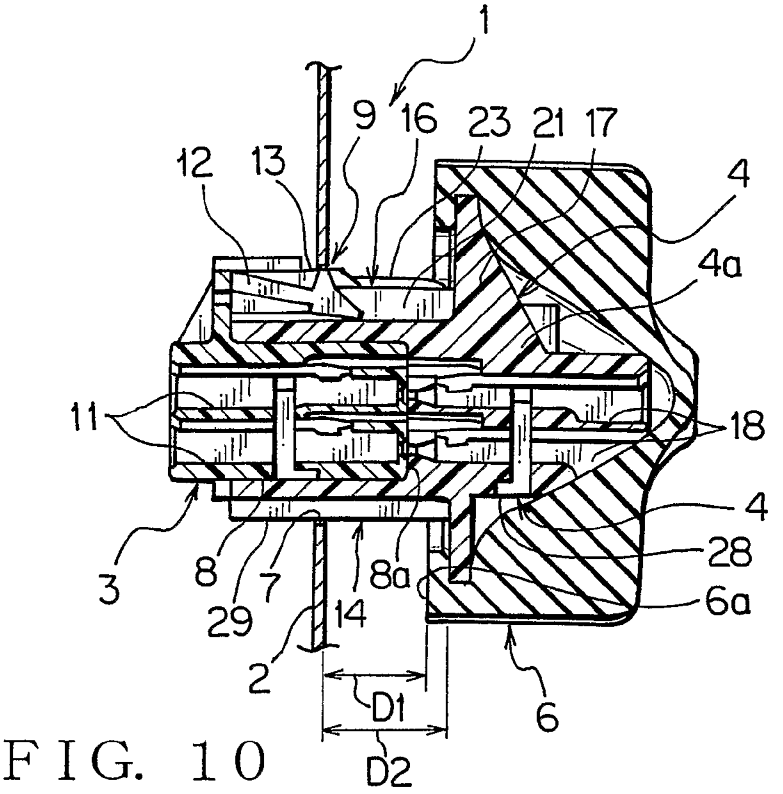
FIG. 10 is a sectional view taken along line X-X in FIG. 4.

After the completion of fitting of the first connector housing 3 and the second connector housing 4, the unlocking rib 16 keeps the locking of the temporary locking arm 9 to the inner edge of the hole 7 of the body panel 2 unlocked, as shown in FIG. 10.

Figure 11:
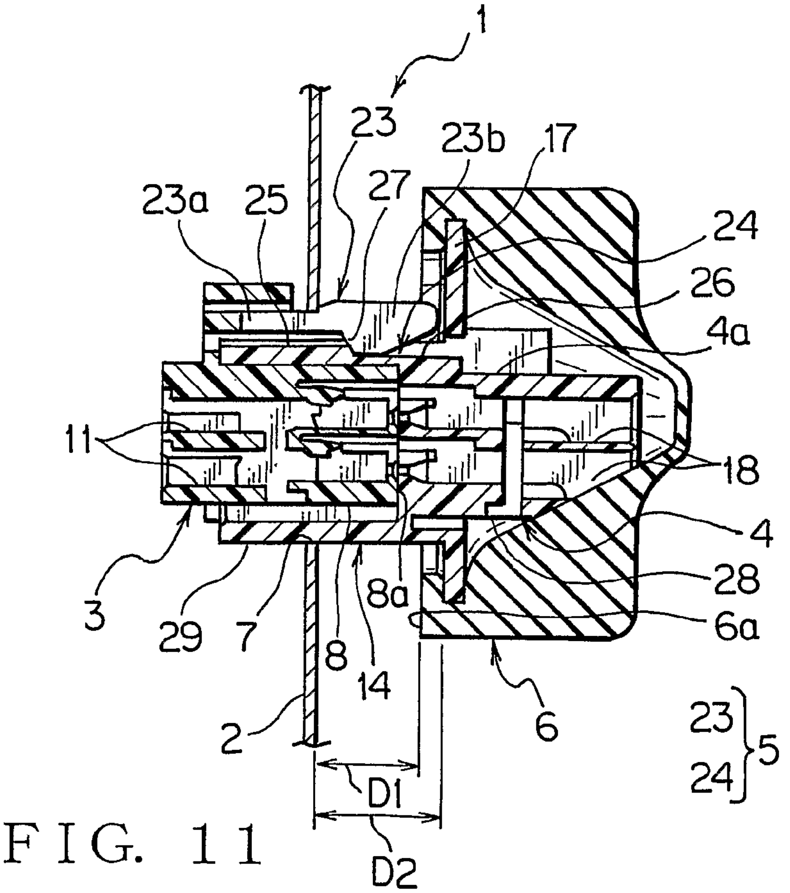
FIG. 11 is a sectional view taken along line XI-XI in FIG. 4.

As shown in FIG. 11, the other endportion 23*b* of the position regulator arm 23 abuts the low portion 26 of the step portion 24. Then the other portion 23*b* approaches to the hood 8 and the position regulator arm 23 returns to the initial state of no deformation. Since the temporary locking arm 9 is unlocked and the other end 23*b* is close to the hood 8, the position regulator arm 23 allows the first connector housing 3 to move relatively with respect to the body panel 2.

Figure 5:
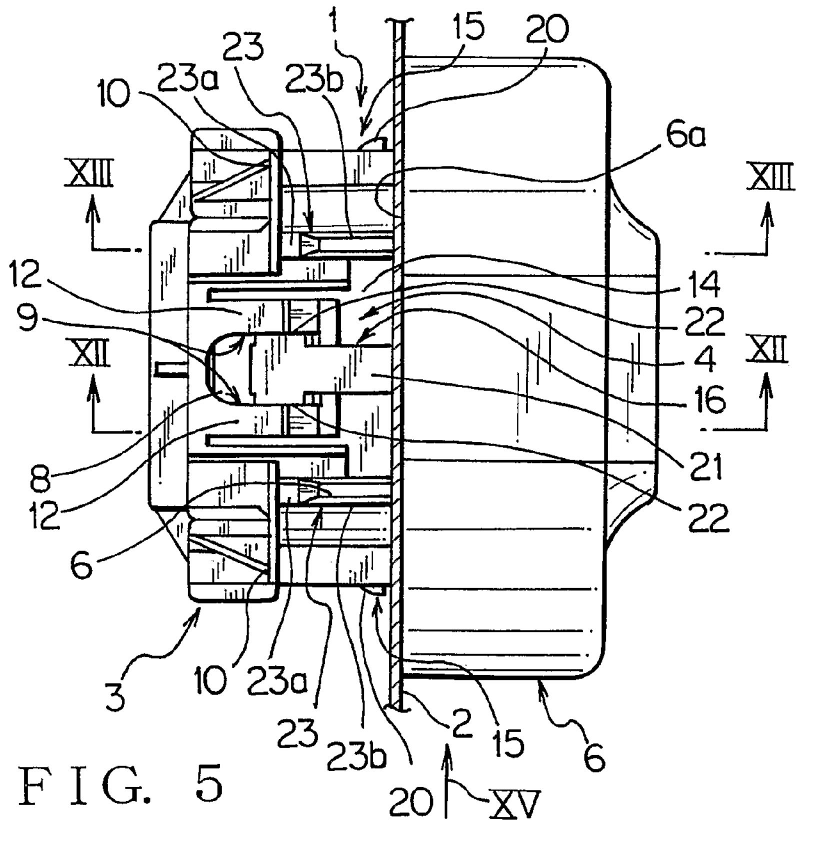
FIG. 5 is a plan view showing the second connector housing depressed toward a body panel as shown in FIG. 4.
Figure 12:
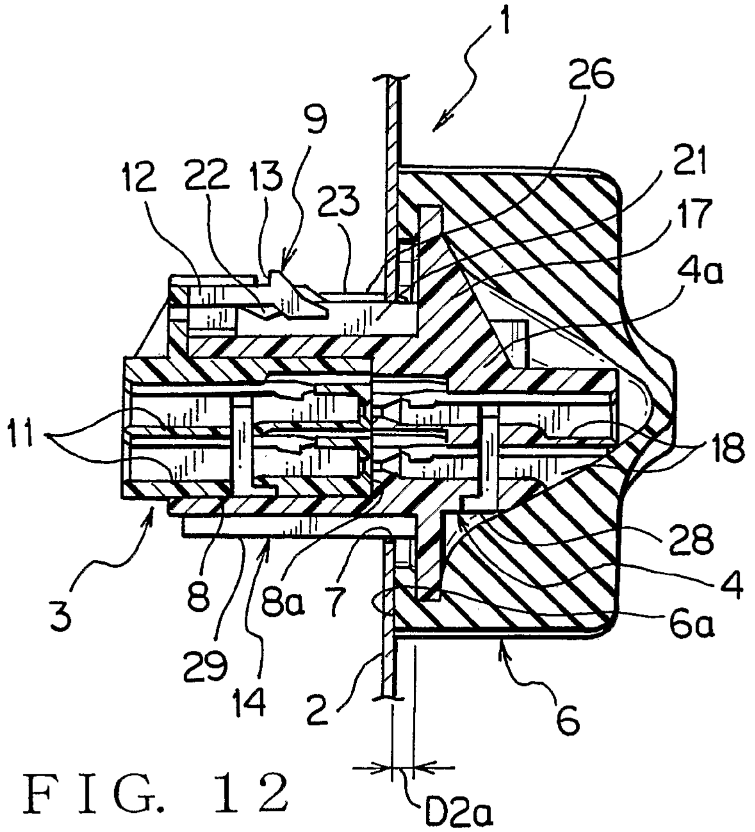
FIG. 12 is a sectional view taken along line XII-XII in FIG. 5.
Figure 15:
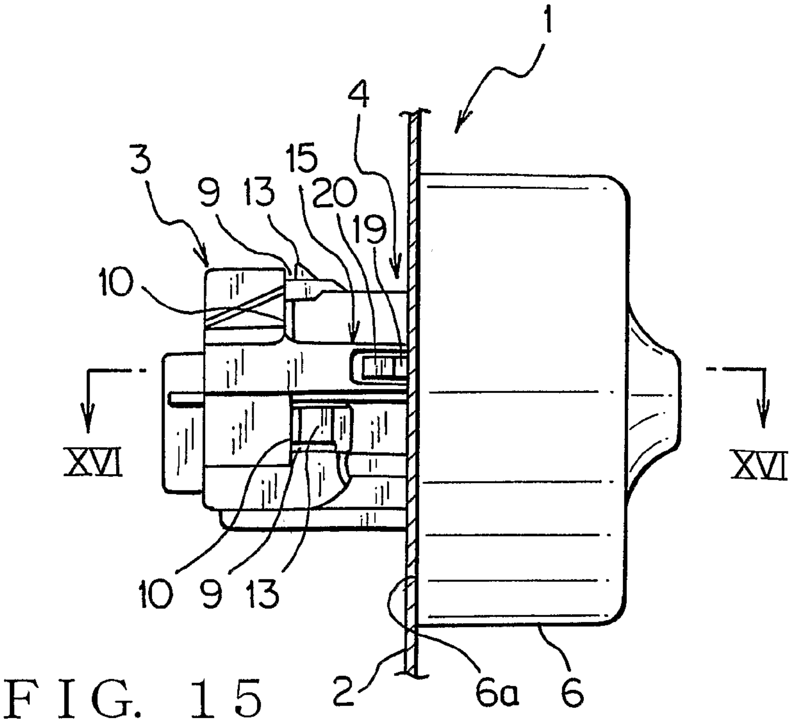
FIG. 15 is a side view of the connector shown in FIG. 5 when viewed from an arrow XV.
Figure 16:
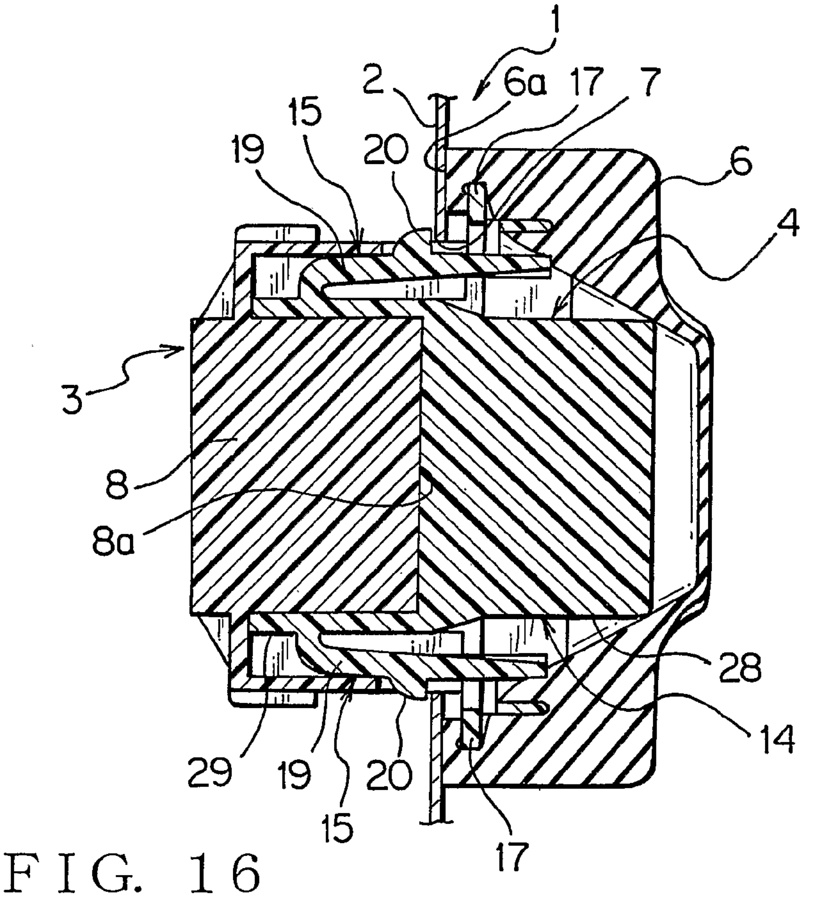
FIG. 16 is a sectional view taken along line XVI-XVI in FIG. 15.

As shown in FIGS. 5 and 12, then, the second connector housing 4, i.e. the grommet 6, is depressed toward the body panel 2. The flange 17, i.e. the end face 6*a* of the grommet 6, approaches to the body panel 2. As shown in FIGS. 13, 15 and 16, the end face 6*a* of the grommet 6 contacts to the surface of the body panel 2. FIG. 16 omits the terminal receivers 11 and 18.

The locking projection 20 of the locking arm 15 fits in the hole 7 of the body panel 2 and the second connector housing 4, i.e. the connector 1 is fixed to the body panel 2. The body panel 2 is positioned between the locking projection 20 and the flange 17 and between the locking projection 20 and the end face 6*a* of the grommet 6. The second connector housing 4, i.e. the connector 1, is fixed to the body panel 2 without rattling. When the end face 6*a* contacts the body panel 2, the grommet 6 is fixed to the body panel 2.

According to the embodiment, the flange 17 of the second connector housing 4 is approached to the body panel 2 after the complete fitting of the connector housings 3 and 4. The locking projection 20 is locked inside the hole 7 of the body panel 2 to locate the body panel 2 between the locking projection 20 and the flange 17. The first connector housing 3 is regulated to move until the complete fitting of the connector housings 3 and 4.

The distance D2*a* (shown in FIGS. 12 and 13) between the flange 17 and the body panel 2 when the connector housings 3 and 4 are fitted completely, is shorter than the distance, which being larger than the distance D2, between the flange 17 and the body panel 2 when the connector housings 3 and 4 are not completely fitted (intermediate fitting).

For this reason, by observing the distance between the flange 17 and the body panel 2, it is easy to confirm whether or not the connector housings 3 and 4 are fitted completely one another.

When the distance between the flange 17 and the body panel 2 reaches to the distance D2*a*, the fitting of the connector housings 3 and 4 is completed.

The first connector housing 3 is regulated in the movement until the complete fitting of the connector housings 3 and 4. For this reason, it is easily ensured that the complete fitting of the connector housings 3 and 4 is made or not.

After fitting the connector housings 3 and 4, the locking projection 20 is locked by approaching the second connector housing 4 to the body panel 2. By way of this, the relative movement of the connector housings 3 and 4 is prevented after locking the locking projection 20. The change of the distance between the flange 17 and the body panel 2 is prevented after locking the locking projection 20. Therefore, it is assuredly ensured whether or not the fitting of the connector housings 3 and 4 is completed.

After the complete fitting of the connector housings 3 and 4, when the second connector housing 4 is approached to the body panel 2, the end face 6*a* of the grommet 6 contacts to the body panel 2. For this reason, when the connector housings 3 and 4 fitted to one another completely, the end face 6*a* of the grommet 6 contacts the body panel 2. When the connector housings 3 and 4 fitted to one another incompletely (intermediate fitting), it causes a gap between the end face 6*a* of the grommet 6 and the body panel 2.

By way of this, by observing the gap between the end face 6*a* of the grommet 6 and the body panel 2, it is easily ensured whether or not the fitting of the pair of connector housings 3 and 4 is completely made.

After fitting the connector housings 3 and 4, the grommet 6 is easily and assuredly attached to the body panel 2 by approaching the second connector housing 4 to the body panel 2.

When the first connector housing 3 is temporarily locked to the body panel 2, the body panel 2 is sandwiched between the temporary locking projection 13 and the press flange 10. By locking the temporary locking projection 13 in the hole 7 of the body panel 2, the first connector housing 3 is prevented from rattling. Therefore, the second connector housing 4 is easily fitted to the first connector housing 3 temporary locked in the hole 7 of the body panel 2.

The connector 1 is attached to the body panel 2 in the embodiment. However, in the present invention, the connector 1 may be attached to other panels besides the body panel 2.

The described embodiments are only the typical embodiments of the present invention. The invention is not limited to the embodiments. Modifications are possible within the scope of the present invention.

INDUSTRIAL APPLICABILITY

In the invention as claimed in claim 1, the distance between the flange and the panel when both connector housings are completely fitted one another is shorter than that when both connectors are incomplete (intermediate fitting). Then, by observing the distance between the flange and the panel, it is easily assured whether or not the pair of connector housings are completely fitted one another.

Both connector housings are fitted one another until the distance between the flange and the panel becomes the distance of both connector housings being completely fitted so that both connector housings are completely fitted one another assuredly.

The first connector housing is regulated to move by way of the position regulator means until the complete fitting of both connectors.

Thereby, it is easily to ascertain the complete fitting or not of the both connectors from the movement of the first connector housing.

The second connector housing is approached to the panel to lock the locking means after fitting the first connector housing. Thereby, the connector housing is prevented from moving relatively after the locking of the locking means. The change of the distance between the flange and the panel is prevented after the locking of the locking means. It is assuredly ensured whether or not both connector housings are completely fitted one another.

In the invention as claimed in claim 2, the end face of the grommet contacts the panel when both connector housings are completely fitted, and it causes the gap between the end face of the grommet and the panel when the fitting is incomplete (intermediate fitting). Then, by observing the gap between the end face of the grommet and the panel, it is easily assured whether or not both connector housings are completely fitted.

The grommet is easily and assuredly attached to the panel by approaching the second connector housing to the panel after fitting both connector housings.

In the invention as claimed in claim 3, by locking the temporary locking means in the hole of the panel temporarily, it is prevented the first connector housing from rattling. Then, the second connector housing is easily fitted to the first connector housing locked in the hole temporarily.

The invention claimed is:

1. A connector comprising:

a first connector housing;

a second connector housing to be fitted to the first connector housing through a hole of a panel positioned between the first and second connector housings;

wherein the first connector housing has a temporary locking means to lock in the hole of the panel, wherein the second connector housing has a main body pass through the hole, a locking means to lock in the hole, and a outwardly projecting flange outside the main body;

an unlocking means for unlocking the temporary lock of the temporary locking means of the first connector housing in the hole when the second connector housing is fitted to the first connector housing temporarily locked in the hole; and a position regulator means for regulating the relative movement of the first connector housing with respect to the panel until the fitting of the first connector housing fitted temporarily in the hole and the second connector housing, and allowing the first connector housing to move relatively with respect to the panel when the fitting is completed, wherein, the panel is positioned between the locking means and the flange which moves the second connector housing toward the panel to lock the locking means in the hole, after the second connector housing is fitted to the first connector housing with the temporary locking means locked temporarily in the hole.

2. The connector as claimed in 1, further comprising a tubular grommet fitted in the outer circumference of the second connector housing, the grommet fitting outside the flange and covering one end of the second connector housing, the one end contacting the panel as the second connector housing approaches when the first connector housing and the second connector housing are fitted one another.

3. The connector as claimed in 1 or 2, further comprising a hood pass through the hole of the panel, and a outwardly projecting press flange on the hood, wherein the press flange holds the panel with the temporary locking means when the temporary locking means is locked temporarily in the hole of the panel.

4. The connector as claimed in claim 2, further comprising a hood pass through the hole of the panel, and an outwardly projecting press flange on the hood, wherein the press flange holds the panel with the temporary locking means when the temporary locking means is locked temporarily in the hole of the panel.

* * * * *